Feb. 10, 1931.    R. L. RYMAL    1,792,123
TIRE INFLATER
Filed Dec. 27, 1927
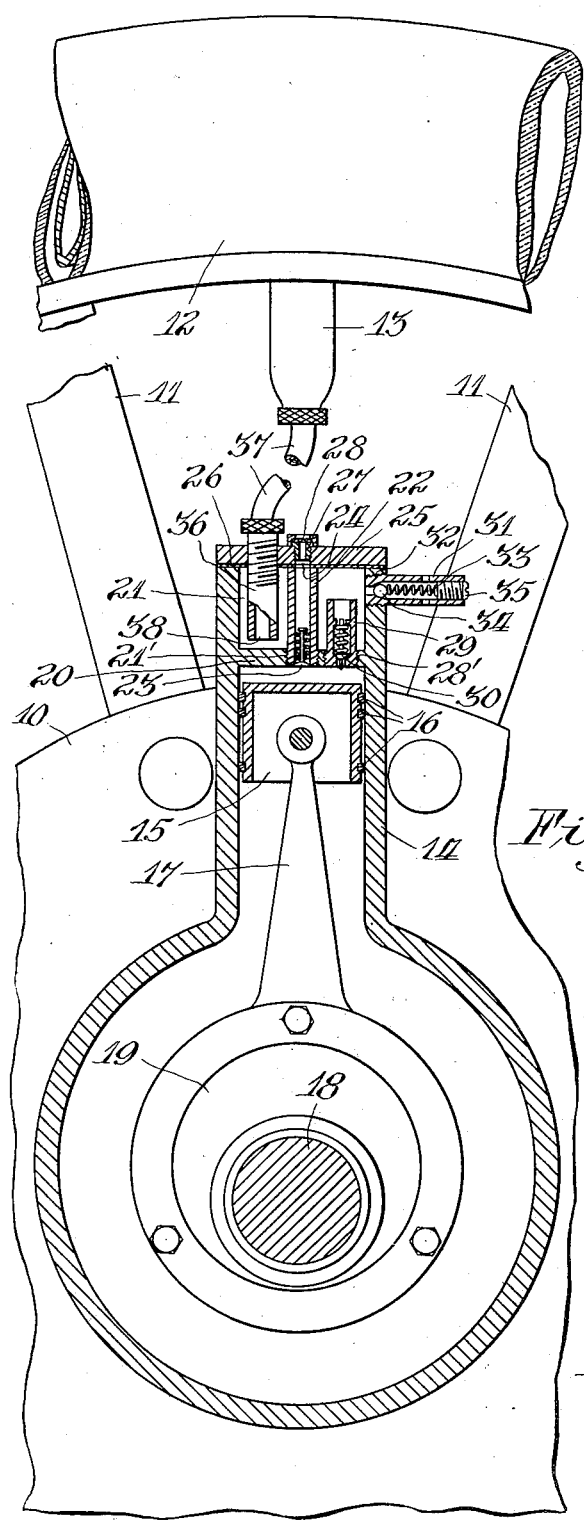
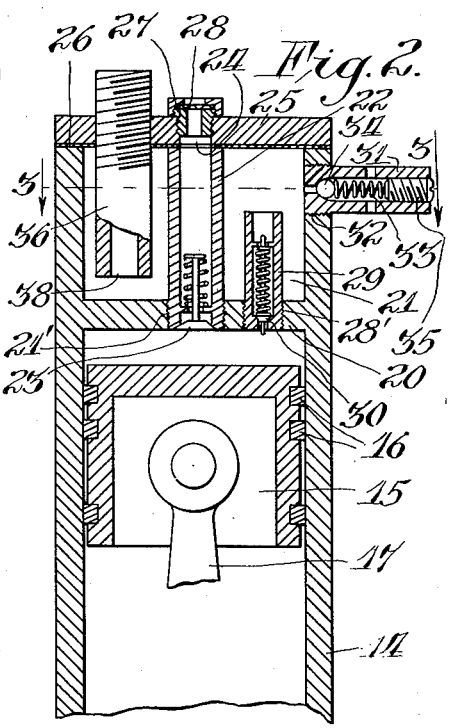
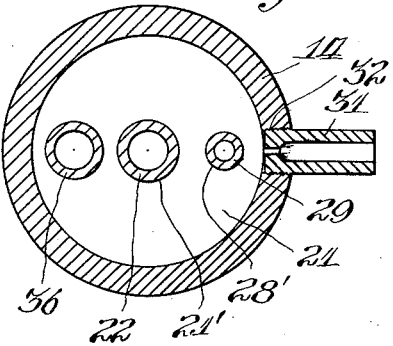
Inventor.
Raymond L. Rymal,
By John P. Smith.
Atty.

Patented Feb. 10, 1931

1,792,123

UNITED STATES PATENT OFFICE

RAYMOND L. RYMAL, OF RIVERSIDE, ILLINOIS

TIRE INFLATER

Application filed December 27, 1927. Serial No. 242,618.

This invention relates to a tire inflater and more particularly to a device which is adapted to be mounted on a wheel of a vehicle having a pneumatic tire thereon for automatically maintaining the inflation of the tire at a predetermined pressure.

One of the objects of the present invention is to provide a simple and compact automatically actuated tire inflater which will maintain the inflation of the tire at a predetermined pressure, but which, at the same time prevents or entirely eliminates the pumping of any lubricant by the pump to the tire.

A still further object of the invention is to provide an improved form of automatically actuated tire inflater for a vehicle wheel having a pneumatic tire thereon in which the centrifugal action of the rotating wheel is employed for preventing the reciprocating pump of the tire inflater from pumping lubricant into the tire.

These and other objects are accomplished by providing construction and an arrangement of the various parts in the manner hereinafter described and particularly pointed out in the appended claims.

Referring to the drawings, Figure 1 is a fragmentary view of a vehicle wheel having my improved tire inflater mounted thereon.

Figure 2 is an enlarged longitudinal cross sectional view of my improved tire inflater, and Figure 3 is a cross sectional view taken on the lines 3—3 in Figure 2.

It has been found by experience that the obstacle to the adoption of an automatically actuated tire inflater for general use, of the type described in the claims in my copending application, Serial Number 171,548, filed February 27th, 1927, is that the tire pump necessary for the operation of a successful tire inflater requires a necessary amount of lubrication to a successful operation and in this type of tire inflater the lubricant finds its way into the tire thereby deteriorating the tire as well as the hose or rubber connections and rendering the tire and rubber connections, as well as the valves, inoperative in a short time because most lubricants or hydrocarbons deteriorate rubber in a short time. It is, therefore, the principal object of my invention to overcome these difficulties by providing a tire inflater which is properly lubricated, but which by reason of the construction, the lubricant is prevented from finding its way into the connecting valves and rubber tires.

In illustrating one embodiment of my invention, I have shown the same in connection with the vehicle wheel which comprises the conventional form of hub 10, spokes 11 and pneumatic tire 12. The pneumatic tire 12 is provided with the usual valve 13. Formed integrally with the hub 10 of the wheel is a cylindrical and radially disposed extension 14. Reciprocally mounted within the cylindrical extension or pump cylinder 14, is a piston 15 which in turn is provided with suitable piston rings 16. The piston 16 is reciprocated in the cylinder 14 by a piston rod connection 17 which is actuated by the shaft 18 of the wheel by an eccentric 19 which is secured in any well known manner to the shaft 18. The cylindrical extension or pump cylinder 14 is provided with a partition wall as shown 20 so as to form substantially a cylindrical recess 21 in the outer end of the cylinder. Located centrally of the partition wall 20 and mounted in a threaded bore 21' is a pipe connection 22 which has mounted in the inner end thereof, a spring actuated intake valve 23. The outer end of the pipe connection 22 registers with an aperture 24 in a cover plate 25 which in turn is secured by suitable screws to the outer end of the cylindrical extension 14. Mounted between the cover plate 25 and the outer edge of the cylindrical extension 14 is a gasket 26 which insures air tight connection between the cover and the cylinder pump. Mounted in threaded engagement with the bore 24 in the cover 25 is a cap 27 which in turn is provided with a screen 28 for screening and preventing the entry of dust and dirt into the pump. Mounted adjacent the tube 22 in a threaded bore 28' is a short tubular nipple 29 which forms the exhaust port for the reciprocating pump. Mounted in the nipple 29 is a spring pressed exhaust valve 30 which permits the compressed air generated by the piston 15 to pass into the air pressure chamber 21. Mounted in the side of the cylindrical extension 14 and communicating with the pressure chamber 21 is an adjustable relief valve 31 which is mounted in a threaded bore 32 adjacent the cover 25. This valve comprises a spring 33, a ball 23 and a screw 35 which is in threaded engagement with the tubular member 31 so that various degrees of pressure may be maintained in the pressure chamber 21 for maintaining the tire at a predetermined pressure. It will, of course, be understood that a graduation may be put on this valve 31 so that any predetermined pressure may be maintained in the pressure chamber 21. Mounted in threaded engagement with the cap 25 and extending to a point adjacent the partition wall 20 is a tubular member 36 to the outside of which may be connected, a conduit or hose connection 37 which has its other end connected to the valve 13 of the tire. From the above description it will be seen that as the wheel revolves in the normal operation of the vehicle, the centrifugal action of the revolving wheel will discharge all surplus lubricant against the inside of the cover 25 and that nothing but the air, free of lubricant, will enter the tubular connection 36 at the point 38 so that no lubricant is delivered to the hose connections 37 or valve 13 or rubber tire 12. It will be further noted that as the lubricant accumulates on the inside of the cover that this excess lubricant will be blown out or discharged through the relief valve 31 and that in no event, will any of the lubricant reach the tire or parts which will be deteriorated thereby.

While in the above specification, I have described one embodiment which my invention may assume in practice, it will, of course, be understood that the same is capable of modification and that modification may be employed within the spirit and scope of my invention as expressed in the following claims.

What I claim as my invention and desire to secure by Letters Patent is:

1. In an inflater, a rotary member having a pneumatic chamber thereon, an air pump mounted on said rotary member, means establishing a permanent connection between said pump and chamber, and means rendered operative by the rotary movement of said air pump to segregate any lubricant from the air prior to its entrance into said chamber.

2. In an inflater, a rotary member having a pneumatic container thereon, an air pump operatively connected to said rotary member, means establishing a permanent connection between said pump and a container and rendered operative by the rotary movement of said air pump to segregate any lubricant from the air prior to its entrance into said container.

3. In an inflater, a rotary member having a pneumatic container thereon, an air pump carried by and operatively connected to said rotary member, means establishing a permanent connection between said pump and container and a trap located between said pump and said container rendered operative by the rotary movement of said air pump to segregate any lubricant from the air prior to its entrance in the said container.

4. In an inflater, a rotary member having a pneumatic container thereon, an air pump mounted on said rotary member and connected with said container, and a lubricant trap formed in said pump and rendered operative by the rotary movement of said air pump to segregate any lubricant from the air prior to its entrance in the said container.

5. In an inflater, a rotary member having a pneumatic container thereon, an air pump mounted on and operatively connected to said rotary member, means establishing a permanent connection between said pump and said container, and a lubricant trap forming an air storage chamber for said pump and rendered operative by the rotary movement of said air pump to segregate any lubricant from the air prior to its entrance in the said container.

6. In an inflater, a rotary member having a pneumatic container thereon, an air pump mounted on said rotary member, means establishing a permanent connection between said pump and container, a chamber formed in said pump structure performing the double function of a lubricant trap and an air pressure chamber whereby said chamber is rendered operative by the rotary movement of said air pump to segregate any lubricant from the air prior to its entrance in the said container.

7. In a tire inflater, a member having a pneumatic container thereon, an air pump mounted on and operatively connected to said rotary member, means establishing a permanent connection between said pump and said container, a chamber formed in said pump and rendered operative by the rotary movement of said air pump to segregate any lubricant from the air prior to its entrance in the said container, and a valve connection with said chamber whereby the excess lubricant as well as the excess pressure is permitted to escape from said chamber.

8. In an inflater, a rotary member having a pneumatic container thereon, an air pump mounted on and operatively connected to said rotary member, means establishing a permanent connection between said pump and said container, a chamber formed integrally with said pump, and a tube protruding in the said chamber substantially radially in the said chamber and rendered operative by the rotary movement of said air pump to segregate any lubricant from the air prior to its entrance in the container.

9. In an inflater, a rotary member having a pneumatic container thereon, an air pump carried by and operatively connected to said rotary member, means establishing a permanent connection between said pump and said container, a chamber located between said pump and said container, a tube protruding into said chamber substantially radially toward the axis of said rotary member and rendered operative by the rotary movement of said air pump to segregate any lubricant from the air prior to its entrance into said container, and a valve in connection with said chamber whereby the excess lubricant is permitted to escape therefrom.

In testimony whereof I have signed my name to this specification, on this 21st day of December, A. D. 1927.

RAYMOND L. RYMAL.